(No Model.)
F. C. SCHIELE.
PIPE COUPLING.
No. 556,106. Patented Mar. 10, 1896.
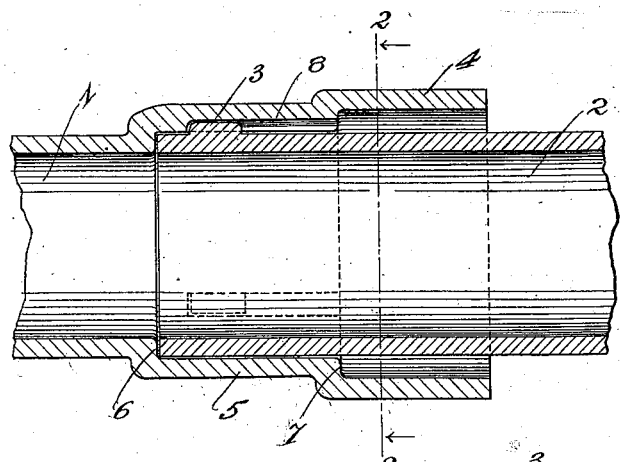
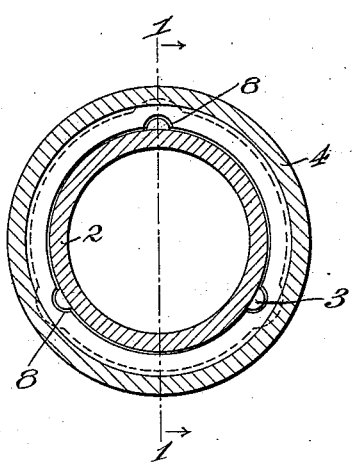
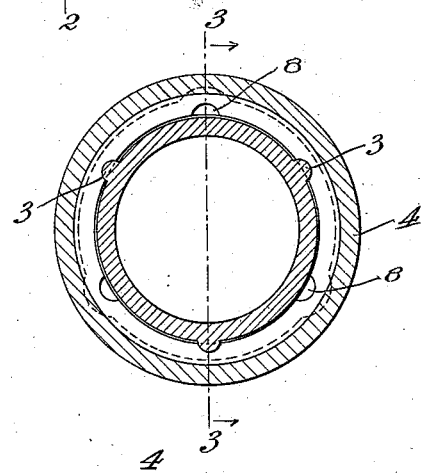
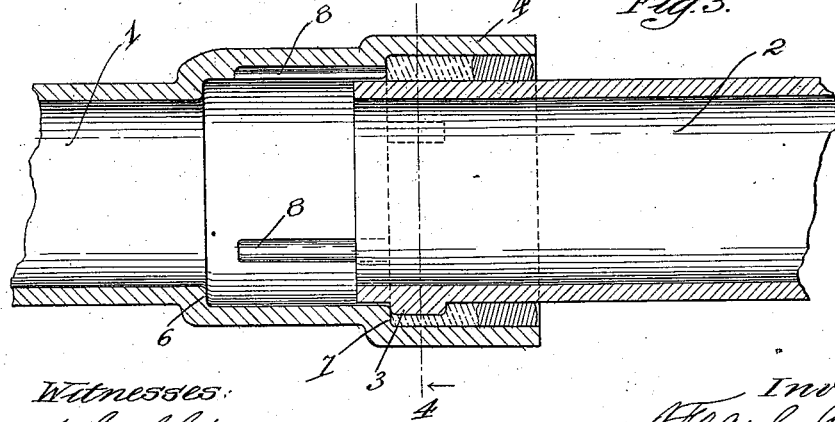
Witnesses:
Arthur Clotz
Rudolph M. Clotz
Inventor
Frank C. Schiele
By Harry Cobb Kennedy
Attorney.

UNITED STATES PATENT OFFICE.

FRANK C. SCHIELE, OF CHICAGO, ILLINOIS.

PIPE-COUPLING.

SPECIFICATION forming part of Letters Patent No. 556,106, dated March 10, 1896.

Application filed August 31, 1894. Serial No. 521,861. (No model.)

*To all whom it may concern:*

Be it known that I, FRANK C. SCHIELE, a citizen of the United States, residing at Chicago, in the county of Cook and State of Illinois, have invented certain new and useful Improvements in Pipe-Couplings; and I do hereby declare the following to be a full, clear, and exact description of the invention, such as will enable others skilled in the art to which it appertains to make and use the same.

This invention relates to a novel construction in a pipe-coupling, and more particularly to a novel construction for stand and waste pipes of buildings, whereby a section or length of these stand or waste pipes can be removed and a new one readily inserted.

The invention consists in the features of construction and combinations of parts hereinafter fully described and specifically claimed.

In the accompanying drawings, illustrating my invention, Figure 1 is a central vertical section of my invention in the position it will assume before making the coupling and when ready for insertion, taken on the line 1 1 of Fig. 2. Fig. 2 is a transverse section of the same on the line 2 2 of Fig. 1. Fig. 3 is a central vertical section of the coupling when made and taken on the line 3 3 of Fig. 4. Fig. 4 is a transverse section of the same on the line 4 4 of Fig. 3.

Stand and waste pipes as generally used are made of cast-iron, and when placed in a building the sections stand one above the other with overlapping ends in the usual manner. It is therefore obvious that if one of these sections or lengths is removed, for any cause, a new section cannot be replaced but that the joint must be patched up in some manner.

It is the object of my invention to provide a pipe-section that can be cast in iron and which can be inserted with a minimum of trouble and expense in lieu of these ordinary cast-iron pipe-sections. To do this I employ two members, the opposite ends of which, or the ends which would correspond to the opposite ends of the pipe-section, being provided with the ordinary end construction of the pipes—that is to say, with a male and female end.

In the accompanying drawings, 1 indicates one member of my pipe-section or coupling, and 2 the other member. These members 1 and 2 are provided with coupling ends. For instance, the member 1, which would carry the male end of the pipe-section, would be the female member of this coupling to receive the male member 2, which would carry at its other end the female part of the coupling of the pipe-section. The member 2 of the pipe-section or coupling is provided near its end with a plurality of lugs 3, regularly disposed around the same, as shown in Fig. 2. The member 1 of the coupling or pipe-section is provided with an enlarged end portion, 4, and an intermediate reduced portion, 5, but which latter is larger than the main portion of the pipe. Between the intermediate portion, 5, and the main portion of the pipe a shoulder 6 is formed, and between the intermediate portion, 5, and the enlarged portion 4 a shoulder 7 is formed. The parts are so arranged that the member 2 of the coupling fits within the intermediate portion, 5, and abuts against the shoulder 6—that is to say, when the lugs 3 enter a plurality of longitudinal grooves 8 in the face of the intermediate portion, 5, which grooves correspond in number and position with the said lugs 3. The said lugs 3, however, are adapted to rest against the shoulder 7 when not in alignment with the grooves 8. The coupling and these pipe-sections are employed in the following manner:

When a section or length of a pipe has been removed, and it is desired to replace the same by a section constructed in accordance with my invention, the two members 1 and 2 are placed together, as shown in Figs. 1 and 2, and when in this position their combined length is shorter than the length of the pipe-section which they are to replace. Therefore it will be noted that they can be placed in position, after which they can be extended—that is to say, they can be separated longitudinally until the outer ends of each section 1 and 2 meet the ends of the two pipe-sections to be coupled, and when this position is reached the lugs 3 will stand about opposite the shoulder 7, but that by turning the pipes relatively to each other the said lugs can be brought to rest against the shoulder in Figs. 3 and 4, and then by placing a suitable packing in the enlarged part of the member a tight joint can be made.

I claim as my invention—

A pipe-coupling comprising a female member having an intermediate portion 5 larger than the main portion of the pipe and provided interiorly with a plurality of grooves 8, an enlarged portion 4 larger than said intermediate portion, and a male member 2 adapted to fit within said intermediate portion 5 and provided exteriorly with a plurality of lugs corresponding in size and location with said grooves, substantially as described.

In testimony whereof I affix my signature in presence of two witnesses.

FRANK C. SCHIELE.

Witnesses:
HARRY COBB KENNEDY,
RUDOLPH WM. LOTZ.